United States Patent
Kamble

(10) Patent No.: US 10,129,220 B2
(45) Date of Patent: Nov. 13, 2018

(54) APPLICATION AND DATA PROTECTION TAG

(71) Applicant: Avocado Systems Inc., San Jose, CA (US)

(72) Inventor: Keshav Govind Kamble, San Jose, CA (US)

(73) Assignee: AVOCADO SYSTEMS INC., San Jose, CA (US)

(*) Notice: Subject to any disclaimer, the term of this patent is extended or adjusted under 35 U.S.C. 154(b) by 0 days.

(21) Appl. No.: 15/181,275

(22) Filed: Jun. 13, 2016

(65) Prior Publication Data

US 2016/0366108 A1    Dec. 15, 2016

Related U.S. Application Data

(60) Provisional application No. 62/175,271, filed on Jun. 13, 2015.

(51) Int. Cl.
H04L 29/06    (2006.01)

(52) U.S. Cl.
CPC .......... *H04L 63/0428* (2013.01); *H04L 63/10* (2013.01); *H04L 63/12* (2013.01); *H04L 63/1433* (2013.01)

(58) Field of Classification Search
CPC . H04L 63/0428; H04L 63/12; H04L 63/1433; H04L 63/10; H04L 67/32
See application file for complete search history.

(56) References Cited

U.S. PATENT DOCUMENTS

| | | | |
|---|---|---|---|
| 6,694,434 B1 | 2/2004 | McGee et al. |
| 7,788,480 B2 | 8/2010 | Winget et al. |
| 7,895,642 B1 | 2/2011 | Larson et al. |
| 8,776,168 B1 | 7/2014 | Gibson et al. |
| 9,077,617 B1 | 7/2015 | Seth et al. |
| 9,094,407 B1 | 7/2015 | Matthieu et al. |
| 9,338,181 B1 | 5/2016 | Burns et al. |

(Continued)

OTHER PUBLICATIONS

"Socket Data Structures and How the TCP Protocol Works" Awad A Younis, CS 457m, Fall 2014. http://www.cs.colostate.edu/~gersch/cs457/CS457_tutorial2.pdf pp. 1-18.*

(Continued)

*Primary Examiner* — Robert Leung
*Assistant Examiner* — Thomas Ho
(74) *Attorney, Agent, or Firm* — Zilka-Kotab, P.C.

(57) ABSTRACT

According to one embodiment, a system includes a processing circuit and logic integrated with and/or executable by the processing circuit. The logic is configured to cause the processing circuit to generate a multi-context ADPL tag unique to a pair of data socket descriptors on which data is to be received and/or transmitted by a first application instance operating on the system and a second application instance operating on a second host. The logic is also configured to cause the processing circuit to embed the ADPL tag as part of an application payload in response to the first application instance calling an API configured to transmit the application payload out from the system via a sender data socket descriptor. More systems, methods, and computer program products are described in accordance with other embodiments.

19 Claims, 6 Drawing Sheets

(56) References Cited

U.S. PATENT DOCUMENTS

| | | |
|---|---|---|
| 9,349,015 B1 | 5/2016 | Archer et al. |
| 9,491,107 B1 | 11/2016 | Scudder et al. |
| 9,652,618 B1 | 5/2017 | Lemer |
| 9,742,768 B2 | 8/2017 | Cholas et al. |
| 9,952,790 B2 | 4/2018 | Kamble |
| 9,954,578 B2 | 4/2018 | Ehrensvard |
| 2003/0118185 A1 | 6/2003 | Lambert |
| 2003/0140089 A1 | 7/2003 | Hines et al. |
| 2004/0034767 A1 | 2/2004 | Robinson et al. |
| 2006/0020814 A1 | 1/2006 | Lieblich et al. |
| 2006/0069912 A1 | 3/2006 | Zheng et al. |
| 2007/0028090 A1 | 2/2007 | Lopez et al. |
| 2007/0033642 A1 | 2/2007 | Ganesan et al. |
| 2007/0129015 A1 | 6/2007 | Iwamoto et al. |
| 2007/0239761 A1* | 10/2007 | Baio ............... G06F 17/30722 |
| 2007/0250923 A1 | 10/2007 | M'Raihi |
| 2008/0115203 A1 | 5/2008 | Elzur |
| 2009/0019535 A1 | 1/2009 | Mishra et al. |
| 2009/0172402 A1 | 7/2009 | Tran |
| 2009/0185687 A1 | 7/2009 | Wankmueller et al. |
| 2009/0228970 A1 | 9/2009 | Morimoto |
| 2009/0328194 A1 | 12/2009 | Kim et al. |
| 2010/0037295 A1 | 2/2010 | Oh et al. |
| 2010/0228964 A1 | 9/2010 | Booth |
| 2010/0275026 A1 | 10/2010 | McLean |
| 2011/0173699 A1 | 7/2011 | Figlin et al. |
| 2011/0302624 A1 | 12/2011 | Chen et al. |
| 2011/0321172 A1 | 12/2011 | Maeda et al. |
| 2012/0051314 A1 | 3/2012 | Goyal et al. |
| 2012/0173875 A1 | 7/2012 | Mahidhara et al. |
| 2012/0311614 A1 | 12/2012 | DeAnna et al. |
| 2013/0179061 A1 | 7/2013 | Gadh et al. |
| 2013/0191905 A1 | 7/2013 | Harada et al. |
| 2014/0036662 A1 | 2/2014 | Takeshima et al. |
| 2014/0051432 A1 | 2/2014 | Gupta et al. |
| 2014/0237545 A1 | 8/2014 | Mylavarapu et al. |
| 2014/0380484 A1 | 12/2014 | Choi et al. |
| 2015/0134965 A1 | 5/2015 | Morenius et al. |
| 2015/0172153 A1 | 6/2015 | Sharma et al. |
| 2015/0213237 A1 | 7/2015 | Kruglick |
| 2016/0080399 A1 | 3/2016 | Harris et al. |
| 2016/0191530 A1 | 6/2016 | Jain et al. |
| 2016/0308904 A1 | 10/2016 | Yoon et al. |
| 2016/0321452 A1 | 11/2016 | Richardson et al. |
| 2016/0364163 A1 | 12/2016 | Kamble |
| 2016/0366142 A1 | 12/2016 | Kamble |
| 2016/0366186 A1 | 12/2016 | Kamble |
| 2016/0366187 A1 | 12/2016 | Kamble |
| 2016/0373485 A1 | 12/2016 | Kamble |
| 2016/0381076 A1 | 12/2016 | Kamble et al. |
| 2017/0006065 A1 | 1/2017 | Kamble et al. |
| 2017/0019388 A1 | 1/2017 | Kamble et al. |
| 2017/0053120 A1 | 2/2017 | Kamble et al. |
| 2017/0230414 A1 | 8/2017 | Kamble |
| 2018/0069862 A1 | 3/2018 | Cholas et al. |
| 2018/0089429 A1 | 3/2018 | Kamble |

OTHER PUBLICATIONS

Beej's Guide to Network Programming using Internet Sockets: Brian "Beej" Hall May 3, 2001. http://www.cs.columbia.edu/~danr/courses/6761/Fall00/hw/pa1/6761-sockhelp.pdf pp. 1-47.*

Wenliang Du, "SYN-Cookies Exploration Lab", Syracuse University. 2006, pp. 1-3.*

Awad A Younis, "Socket Data Structures and How the TCP protocol works", CS457 Fall 2014, pp. 1-18.*

Kamble, K., U.S. Appl. No. 15/181,304, filed Jun. 13, 2016.

Notice of Allowance from U.S. Appl. No. 15/181,304, dated Dec. 15, 2017.

Kamble, K., U.S. Appl. No. 15/182,505, filed Jun. 14, 2016.

Non-Final Office Action from U.S. Appl. No. 15/182,505, dated Apr. 6, 2018.

Kamble, K., U.S. Appl. No. 15/182,544, filed Jun. 14, 2016.

Non-Final Office Action from U.S. Appl. No. 15/182,544, dated Mar. 16, 2018.

Kamble, K., U.S. Appl. No. 15/182,548, filed Jun. 14, 2016.

Non-Final Office Action from U.S. Appl. No. 15/182,548, dated Jun. 15, 2018.

Kamble, K., U.S. Appl. No. 15/184,956, filed Jun. 16, 2016.

Non-Final Office Action from U.S. Appl. No. 15/184,956, dated Mar. 30, 2018.

Kamble et al., U.S. Appl. No. 15/191,420, filed Jun. 23, 2016.

Non-Final Office Action from U.S. Appl. No. 15/191,420, dated Mar. 22, 2018.

Kamble et al., U.S. Appl. No. 15/197,635, filed Jun. 29, 2016.

Non-Final Office Action from U.S. Appl. No. 15/197,635, dated May 11, 2018.

Kamble et al., U.S. Appl. No. 15/210,828, filed Jul. 14, 2016.

Non-Final Office Action from U.S. Appl. No. 15/210,828, dated Jun. 13, 2018.

Kamble et al., U.S. Appl. No. 15/243,854, filed Aug. 22, 2016.

Kamble, K., U.S. Appl. No. 15/275,239, filed Sep. 23, 2016.

Non-Final Office Action from U.S. Appl. No. 15/275,239, dated May 16, 2018.

Kamble, K., U.S. Appl. No. 15/424,749, filed Feb. 3, 2017.

Final Office Action from U.S. Appl. No. 15/191,420, dated Aug. 14, 2018.

Notice of Allowance from U.S. Appl. No. 15/184,956, dated Sep. 4, 2018.

Non-Final Office Action from U.S. Appl. No. 15/424,749, dated Sep. 19, 2018.

Notice of Allowance from U.S. Appl. No. 15/182,544, dated Oct. 4, 2018.

Non-Final Office Action from U.S. Appl. No. 15/243,854, dated Oct. 5, 2018.

* cited by examiner

FIG. 4A — 400

| SFD 402 | ID1 404 | ID2 406 | Res1 408 | Security Profile 410 | Secure Source Signature 412 | Length 414 | Seq. ID 416 | Res2 418 | EFD 420 |

FIG. 4B — 450

| Eth-L2 428 | IPv4/IPv6 426 | TCP/UDP 424 | ADPL 400 | Application Payload 422 |

FIG. 4C — 460

| Eth-L2 428 | IPv4/IPv6 426 | TCP/UDP 424 | Application Payload 422 | ADPL 400 | Application Payload 422 |

APPLICATION AND DATA PROTECTION TAG

FIELD OF THE INVENTION

The present invention relates to network and system protection, and more particularly, this invention relates to using an embedded security header as part of a payload of a packet.

BACKGROUND

Applications are made up of a large number of instructions and data. Instructions operate on data which is fetched in a cache and memory and is always unencrypted. Scaled out, distributed applications are made up of a large number of application instances. These application instances have their own data in the cache and memory of the processor on which these applications run. A large number of such application instances communicate with each other and process data in parallel to create an aggregate output.

These types of scaled-out applications are extremely vulnerable to application breaches, data thefts from cache and memory by scraping, and other methods of illicitly obtaining data from the applications, cache, and/or memory. In data centers which cater to important applications and data types, such as Personally Identifiable Information (PII), Payment Card Industry (PCI) data, medical information that falls under Health Insurance Portability and Accountability Act (HIPAA), military and Government critical tasks, any application and/or data breach is very destructive and expensive to contain and/or resolve. Therefore, it is beneficial to attempt to prevent such breaches.

SUMMARY

In one embodiment, a method includes generating a multi-context application and data protection layer (ADPL) tag unique to a pair of data socket descriptors on which data is to be received and/or transmitted by a first application instance operating on a first host and a second application instance operating on a second host. The method also includes embedding the ADPL tag as part of an application payload in response to the first application instance calling an application programming interface (API) configured to transmit the application payload out from the first host via a sender data socket descriptor.

According to another embodiment, a system includes a processing circuit and logic integrated with and/or executable by the processing circuit. The logic is configured to cause the processing circuit to generate a multi-context ADPL tag unique to a pair of data socket descriptors on which data is to be received and/or transmitted by a first application instance operating on the system and a second application instance operating on a second host. The logic is also configured to cause the processing circuit to embed the ADPL tag as part of an application payload in response to the first application instance calling an API configured to transmit the application payload out from the system via a sender data socket descriptor.

In yet another embodiment, a computer program product includes a computer readable storage medium having program instructions stored thereon. The program instructions are executable by a processing circuit to cause the processing circuit to generate a multi-context ADPL tag unique to a pair of data socket descriptors on which data is to be received and/or transmitted by a first application instance operating on a first host and a second application instance operating on a second host. The program instructions are also executable by the processing circuit to cause the processing circuit to embed the ADPL tag as part of an application payload in response to the first application instance calling an API configured to transmit the application payload out from the first host via a sender data socket descriptor.

The embodiments described above may be implemented in any computing system environment known in the art, such as a networking environment, which may include a processor and a computer readable storage medium configured to store data and logic, the logic being implemented with and/or executable by the processor to cause the processor to perform one or more functions.

BRIEF DESCRIPTION OF THE DRAWINGS

The following descriptions of the drawings are not meant to be limiting on what is taught by the drawings in any manner. For a fuller understanding of the content of each drawing, the following brief descriptions are provided, which when read in conjunction with the detailed description, describe the full breadth of the various embodiments of the present invention.

FIG. 4A shows an Application and Data Protection Layer (ADPL) tag according to one embodiment.

FIG. 4B shows a packet having an ADPL tag embedded therein, according to one embodiment.

FIG. 4C shows a packet having an ADPL tag embedded therein, according to another embodiment.

FIG. 4D shows a series of packets having a single ADPL tag embedded in one packet, according to one embodiment FIG. 4E shows a series of packets having an ADPL tag embedded within each packet, according to another embodiment.

DETAILED DESCRIPTION

Figure 1:
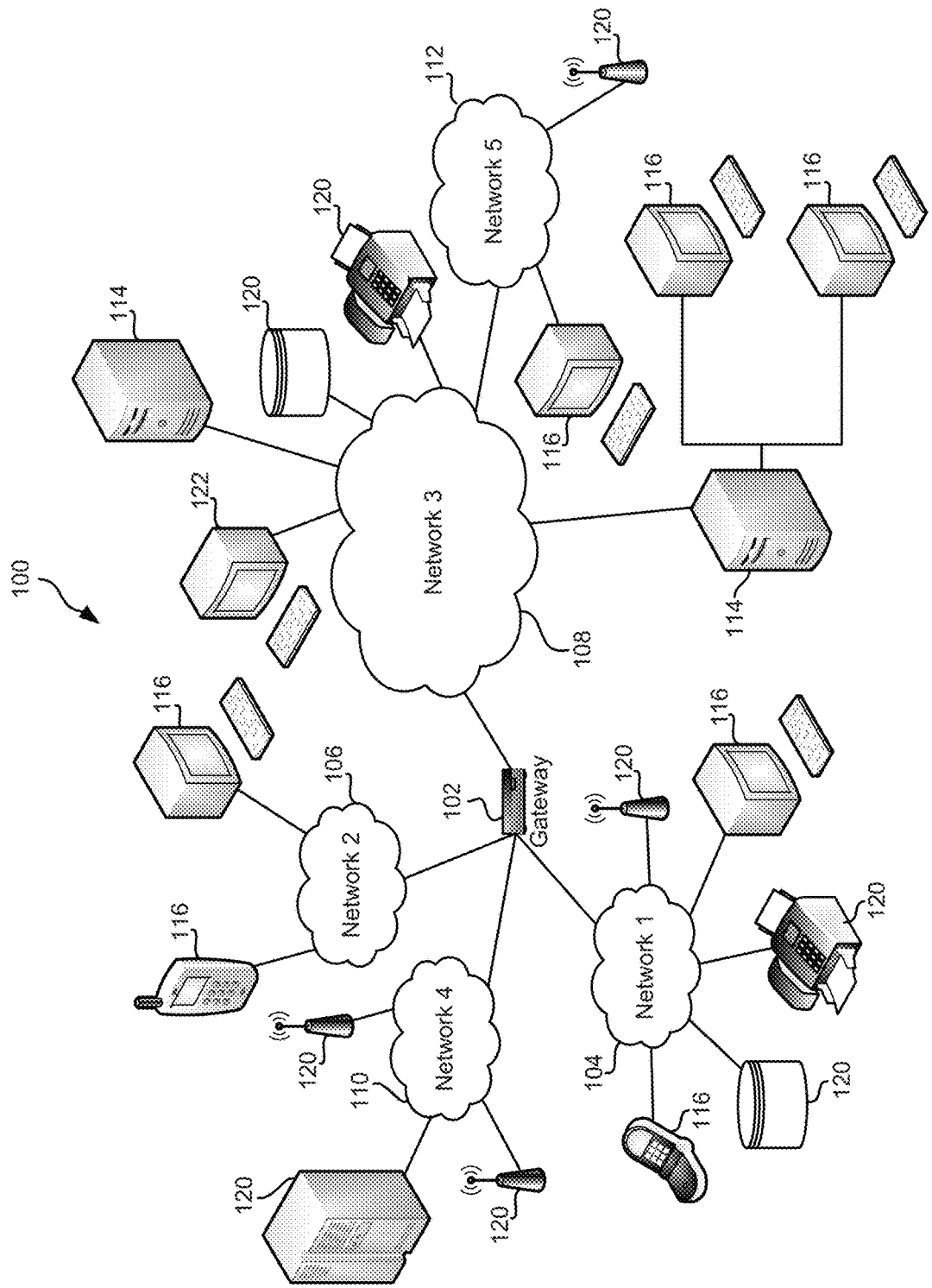
FIG. 1 shows a network architecture, according to one embodiment.

The descriptions presented herein are intended to enable any person skilled in the art to make and use the present invention and are provided in the context and requirements of particular applications of the present invention.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an," and "the" include plural referents unless otherwise specified.

Moreover, the term "about" when used herein to modify a value indicates a range that includes the value and less and greater than the value within a reasonable range. In the absence of any other indication, this reasonable range is plus and minus 10% of the value. For example, "about 10 milliseconds" indicates 10 ms±1 ms, such that the range includes all values in a range including 9 ms up to and including 11 ms.

Also, the term "comprise" indicates an inclusive list of those elements specifically described without exclusion of any other elements. For example, "a list comprises red and green" indicates that the list includes, but is not limited to, red and green. Therefore, the list may also include other colors not specifically described.

Various modifications to the disclosed embodiments will he readily apparent to those skilled in the art and the general principles defined herein may be applied to other embodiments and applications without departing from the spirit and scope of the present invention. Thus, the present invention is not intended to be limited to the embodiments shown and described herein, but is to be accorded the widest scope consistent with the principles and features disclosed herein.

In particular, various embodiments of the invention discussed herein may be implemented using a network, such as the Internet, to communicate among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN), or other communication media. In addition, various combinations of wired (e.g., Ethernet), wireless (e.g., radio frequency) and optical communication links (e.g., fiber optic) may be utilized.

The term application as used herein refers to any type of software and/or hardware-based application, such as enterprise data center applications, Internet-of-Things (IOT) applications, Industrial control applications, military applications, etc.

Enterprise data center applications may include any of the following application types: financial applications, equity trading applications, healthcare applications, financial transaction applications, etc.

IOT applications may include any of the following application types: mobile communication applications, home automation/control applications, industrial automation/control applications, security and monitoring applications, etc.

Industrial control applications may include any of the following application types: nuclear power plant control, thermal power plant control, hydro-electric power plant control, wind farm control, electricity grid and distribution control, water treatment control, land-based traffic control, air traffic control, etc.

Military applications may include any of the following application types: military installation control, first alert system control, autoguided weapon system control, military weaponized equipment control including manned vehicles, weaponized and/or surveillance-oriented unmanned vehicle control (drones) such as unmanned aerial vehicles (UAVs), unmanned aircraft systems (UASs), unmanned underwater vehicles (UUVs), unmanned ground vehicles (UGVs), etc.

A program environment in which one embodiment may be executed illustratively incorporates one or more general-purpose computers and/or special-purpose devices, such as switches, routers, switch controllers, etc. Details of such devices (e.g., processor, memory, data storage, input devices, and output devices) are well known and are omitted for the sake of clarity.

It should also be understood that the techniques of the present invention may be implemented using a variety of technologies. For example, the methods described herein may he implemented in software running on a computer system, implemented in hardware utilizing one or more hardware processors and logic (hardware logic and/or software logic) implemented with and/or executable by the hardware processor. The logic is configured to cause the processor to perform operations of a method, and may take any form known to those of skill in the art, such as application specific integrated circuits (ASICs), programmable logic devices such as Field Programmable Gate Arrays (FPGAs), and/or various combinations thereof.

In one illustrative approach, methods described herein may be implemented by a series of computer-executable instructions stored to a computer readable storage medium, such as a physical (e.g., non-transitory) data storage medium. In addition, although specific embodiments may employ object-oriented software programming concepts, the present invention is not so limited and is adaptable to employ other forms of directing the operation of a processor.

The present invention may also be provided in the form of a computer program product comprising a computer readable storage medium having program instructions thereon or a computer readable signal medium having program instructions therein, which may be executed by a computing device (e.g., a processor) and/or a system. A computer readable storage medium may include any medium capable of storing program instructions thereon for use by a computing device or system, including optical media such as read only and writeable CDs and DVDs, magnetic memory or media (e.g., hard disk drive, magnetic tape, etc.), semiconductor memory (e.g., FLASH memory, non-volatile random access memory (NVRAM), and other non-volatile storage media known. in the art), firmware encoded in a microprocessor, etc.

A computer readable signal medium is one that does not fit within the aforementioned computer readable storage medium definitions. For example, illustrative computer readable signal media communicate or otherwise transfer transitory signals within a system, between systems, etc., e.g., via a physical or virtual network having a plurally of connections.

FIG. 1 illustrates an architecture 100, in accordance with one embodiment. As an option, the present architecture 100 may be implemented in conjunction with features from any other embodiment listed herein, such as those described with reference to the other figures. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks are provided including a first remote network 104 and a second remote network 106. A gateway 102 may be coupled between the remote networks 104, 106 arid a proximate network 108. In the context of the present network architecture 100, the networks 104, 106 may each take any form including, but not limited to, a LAN, a WAN such as the Internet, a storage area network (SAN), a public switched telephone network (PSTN), an internal telephone network, etc. Additional networks 110, 112 may also be connected via the gateway 102 or some other connection device known in the art. These networks may be of a different type than the networks 104, 106. For example, network no may be a network devoted to the IOT, and may provide infrastructure and protocols for communication between all devices in the IOT, and between any devices in the IOT and the networks 104, 106. In another example, network 112 may be a network devoted to Industrial control, and may provide infrastructure and protocols for communication within and/ or between facilities anywhere in the world, including automated devices, manufacturing lines, assembly lines, processing control software, etc.

In use, the gateway 102 serves as an entrance point from the remote networks 104, 106 to the proximate network 108. As such, the gateway 102 may function as a router, which is capable of directing a given packet of data that arrives at the gateway 102, and a switch, which furnishes the actual path in and out of the gateway 102 for a given packet.

Further included in the network architecture 106 is at least one data server 114 coupled to the proximate network 108, and which is accessible from the remote networks 104, 106 via the gateway 102. It should be noted that the data server(s) 114 may include any type of computing device/groupware. Coupled to each data server 114 is a plurality of user devices 116. User devices 116 may include any device known by those of skill in the art, such as a desktop computer, a laptop computer, a hand-held computer, a smartphone, a terminal, a port, a printer, some type or form of logic, etc. It should he noted that a user device 122 may also be directly coupled to any of the networks, in one embodiment.

A peripheral 120 or series of peripherals 120, e.g., facsimile machines, printers, networked storage units, hard disk drives, wireless routers, etc., may be coupled to one or more of the networks 104, 106, 108, 110, 112. It should be noted that databases, servers, mainframes, and/or additional components may be utilized with and/or integrated into any type of network element coupled to the networks 104, 106, 108, 110, 112. In the context of the present descriptions, a network element may refer to any component of a network, system,device, and/or any device useable in a network.

According to some approaches, methods arid systems described herein may be implemented with and/or utilized on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of virtualization software, such as VMWARE ESX, MICROSOFT HYPER-V, SIMICS, etc., in some embodiments, In more approaches, one or more of the networks 104, 106, 108, 110, 112 may represent a cluster of systems commonly referred to as a "cloud." In cloud computing, shared resources, such as processing power, peripherals, software, data processing, servers, storage, etc., are provided to any system that has access to the cloud and permission to access the specific resource, preferably in an on-demand relationship, thereby allowing access and distribution of services across many computing systems. Cloud computing typically involves an Internet or other high speed connection (e.g., 4 G LTE, fiber optic, etc.) between the systems operating in the cloud, but other techniques of connecting the systems may also be used as would be understood by those of skill in the art.

Figure 2:
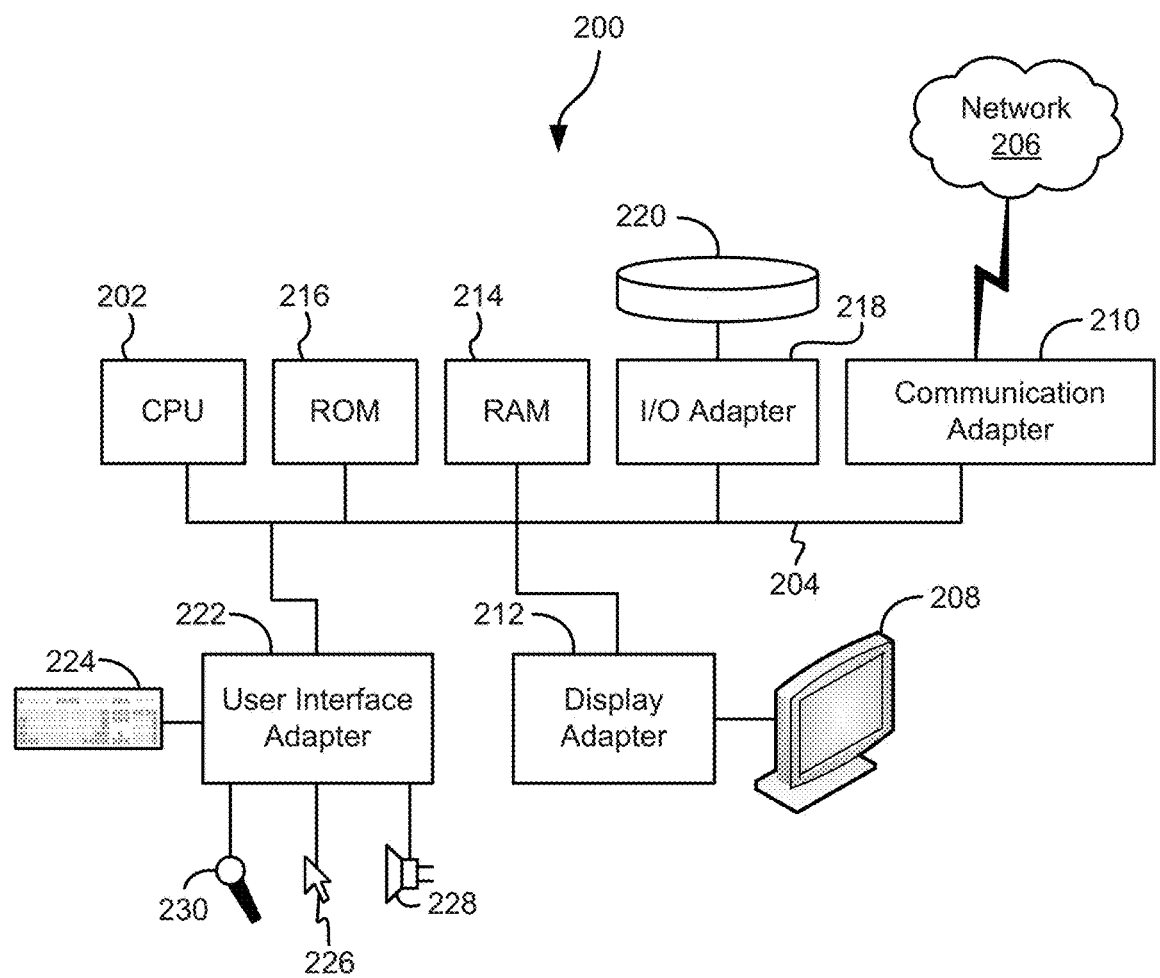
FIG. 2 shows a hardware environment that may be associated with the network architecture of FIG. 1, according to one embodiment.

FIG. 2 shows a representative hardware environment associated with a user device 116 and/or a server 114 of FIG. 1, in accordance with one embodiment. FIG. 2 illustrates a typical hardware configuration of a workstation 200 having a central processing unit 202, such as a microprocessor, and a number of other units interconnected via a system bus 204.

The workstation 200 shown in FIG. 2 includes a Random Access Memory (RAM) 214, Read Only Memory (RUM) 216, an I/O adapter 218 configured to connect peripheral devices, such as disk storage units 220 to the bus 204, a user interface adapter 222 configured to connect a keyboard 224, a mouse 226, a speaker 228, a microphone 230, and/or other user interface devices such as a touch screen, a digital camera, etc., (riot shown) to the bus 204, communication adapter 210 configured to connect the workstation 200 to a communication network 206 (e.g., a data processing network) and a display adapter 212 configured to connect the bus 204 to a display device 208.

The workstation 200 may have resident thereon an operating system, such as the MICROSOFT WINDOWS Operating System (OS), a MAC OS, a UNIX OS, etc. It will be appreciated that a preferred embodiment may also be implemented on platforms and operating systems other than those specifically mentioned herein. A preferred embodiment may be written using JAVA, XML, C, and/or C++ language, SCALA, COBOL, FORTRAN, or other programming languages, along with an object oriented programming methodology or scripting language such as PERL, PYTHON, Tcl/Tk, or other scripting languages. Object oriented programming (OOP), which has become increasingly used to develop complex applications, may also be used.

Moreover, one or more hardware processors may be implemented in a processing circuit in the workstation 200. The processing circuit includes the one or more hardware processors, along with any connections or links therebetween necessary to interconnect the one or more processors in the processing circuit. In addition, the processing circuit may be implemented with logic and/or may be configured to execute logic, with the logic being configured to cause the processing circuit to perform functionality specified by the logic.

Figure 3:
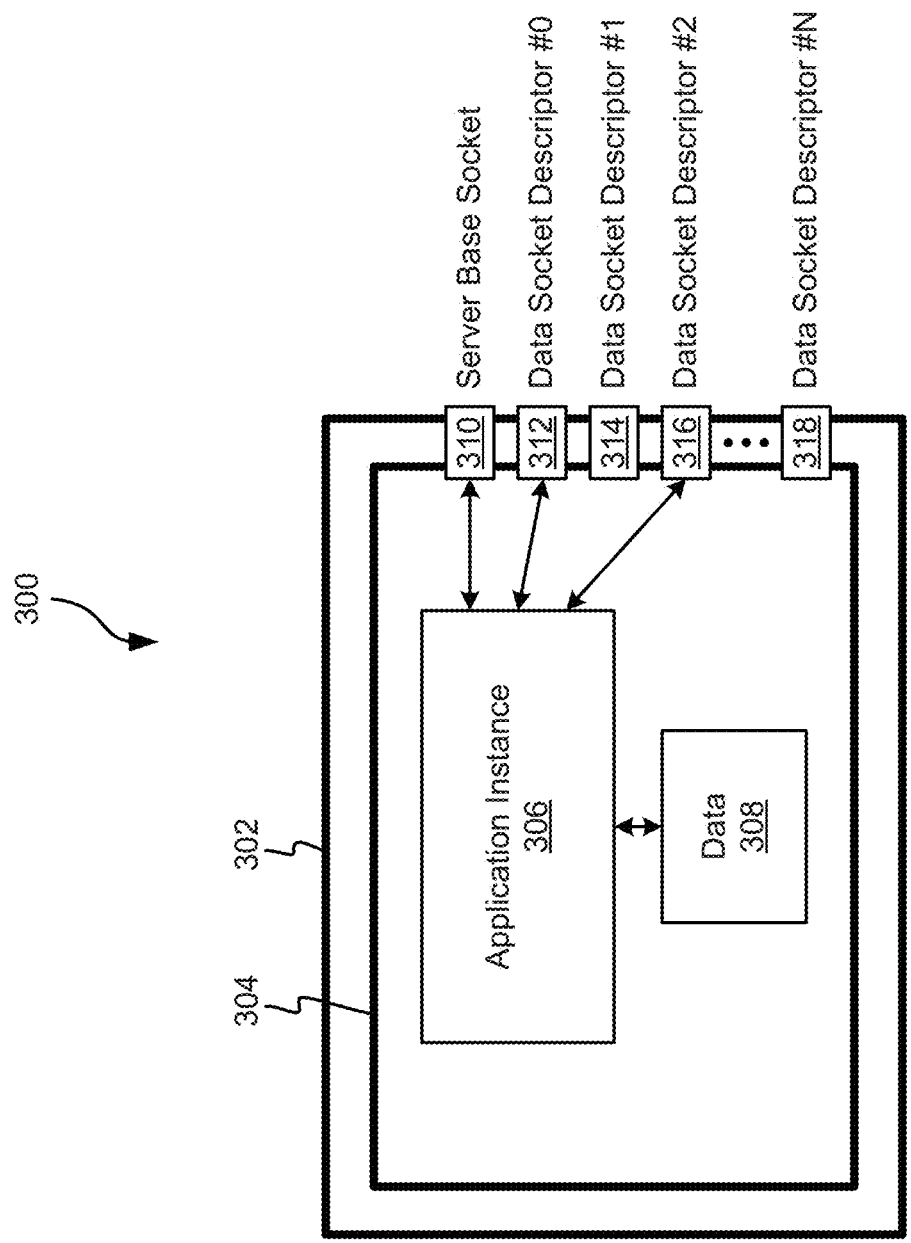
FIG. 3 shows a logical representation of an application instance operating on a computing system, in accordance with one embodiment.

Now referring to FIG. 3, a logical representation of an application instance 306 operating on a computing system 300 is shown according to one embodiment. Although only one application instance 306 and one set of data 308 is shown in FIG. 3, as would be understood by one of skill in the art, any number of application instances and groups of data may be hosted on a computing system 300, limited only by the processing power and/or other resources available to the computing system 300.

As shown in FIG. 3, an application protection layer (APL) 302 and a data protection layer (DPL) 304 are represented within the computing system 300, according to one embodiment. The application instance 306 has access to data 308 within the computing system 300. Also, the application instance 306, through any number of standard and/or custom APIs, may utilize any of a plurality of data socket descriptors (e.g., data socket descriptor #0 312, data socket descriptor #1 314, data socket descriptor #2 316, . . . , data socket descriptor #N 318) with which to communicate (send and/or receive) information outside of the application instance 306 or computing system 300. One or more server base sockets 310 is provided in the application instance 306 of computing system 300 arid is used for control of the peer application instances on the computing system 300, outside the system, or outside the application instance 306 itself, as would be understood by one of skill in the art.

In order to provide application and data protection to application instances of distributed, scaled out applications which have instances operating on a plurality of computing systems, at least two operations may be performed, and are described below according to one embodiment.

In a first operation, application instances, such as application instance 306, are identified based upon data socket descriptor attributes that an application instance uses to communicate between other application instances and/or group(s) of application instances on/or outside of the computing system 300. For example, in response to application instance 306 utilizing data socket descriptor #0 312 consistently to communicate with another system, an association may he established between data socket descriptor #0 312 and the application instance 306. By consistently, what is meant is that application instance 306 utilizes data socket descriptor #0 312 to communicate with another system more than a predetermined number of times within a given period of time, according to one embodiment. In another embodiment, consistently utilizing a data socket descriptor means that only a specific data socket descriptor is used in exclusion of all others over a given period of time.

In a second operation, a group is formed which includes any application instance which has all of the same socket descriptor attributes (or at least a predetermined amount of the same socket descriptor attributes, or the same of a certain group of socket descriptor attributes), e.g., data exchange sockets of the same application base socket, transport protocol, server port, various multi-tenancy characteristics, storage characteristics, payload sizes, container attributes, and/or multiple time contexts are grouped together.

Any socket descriptor attributes may be considered when determining whether an application instance shares data socket descriptor attributes with another application instance, such as OS and container attributes which include server port, transport protocol, network address translation (NAT) IP address range, maximum transmission unit (MTU), application payload sizes, user programmable attributes such as multi-tenancy labels, etc.

Using the above two operations, two layers of protection (application protection arid data protection) are enacted together to protect the application (not shown) from which the application instance 306 is provided and any group of application instances related to the application that provides the application instance 306.

FIG. 3 shows the Application and Data Protection Layer (ADPL) libraries which keep track of the server base socket 310 and various data socket descriptors 312, 314, 316, . . . , 318 opened by an application instance 306 for communication of data with one or more peer applications outside of the computing system 300. The data socket descriptors 312, 314, 316, . . . , 318 are used for the exchange of data with another system outside of the computing system 300.

The data socket descriptors 312, 314, 316, . . . , 318 are numbers that represent attributes and/or characteristics of different data exchanges between the application instance and one or more receiver hosts. Each data socket descriptors 312, 314, 316, . . . , 318 may have a size ranging from 12 to 48 bits, such as 32 bits in one embodiment.

Each of the Application Protection Layer (APL) 302 and the Data Protection Layer (DPL) 304 utilize individual sets of application programming interfaces (APIs) that are configured to piggyback on existing APIs, but add specialized functionality to any action performed using the existing APIs.

These new socket APIs and data protection APIs, and the type of application payload sent and received, do not disturb the intermediate security appliances such as firewall, Intrusion Prevention and Intrusion Detection, etc.

The application instance 306 utilizes the one or more server base socket(s) 310 with standard and/or private well-known port number(s) as a control socket, but opens a new data socket descriptor and allocates a different port number to the new data socket descriptor in order to handle actual functionality and data transfer between the computing system 300 and any other external or peer system. The server base socket 310 has the following attributes and/or characteristics:

1. A server and/or a source internet protocol (IP) interface.
2. A standard and/or known server port number, e.g., transmission control protocol (TCP) port, user datagram protocol (UDP) port, etc.
3. A maximum number of allowable waiting connections.
4. A maximum (and possibly minimum) application packet buffer size usable for transmitting and receiving data.
5. Other socket options provided by the operating system, the user, or an external input.

The above described attributes and/or characteristics may also be attributed to the plurality of allocated data socket descriptors 312, 314, 316, . . . , 318. When a connection is established between the computing system 300 and another system via the application instance 306, a data socket descriptor is allocated. The allocated data socket descriptor has the following attributes and/or characteristics:

1. A server and/or a source IP interface.
2. A standard and/or known server port number, e.g., transmission control protocol (TCP) port, user datagram protocol (UDP) port, etc.
3. A maximum number of allowable waiting connections.
4. Application packet buffer size for transmit and receive.
5. A port number of the transport of the allocated data socket descriptor (in the computing system 300).
6. An IP address of the peer data socket descriptor (in an external system) of the allocated data socket descriptor (usually, but not always, in TCP sockets).
7. A port number of the transport of the peer data socket descriptor of the allocated data socket descriptor in all cases of controlled port allocations by the application instance 306.
8. A maximum (and possibly minimum) application packet buffer size usable for transmitting data to and receiving data from (transmissions with) the peer data socket descriptor.

Apart from the above described characteristics and/or attributes, additional characteristics that may be attributable to an allocated data socket descriptor include:

9. A first identifier (ID1): a globally unique identification number given for an entity (such as an enterprise, company, university, city subdivision, etc.) that utilizes the ADPL mechanism in the application instances or programmed for proprietary purposes.
10. A second ID (ID2): a unique identification number within the entity (not necessarily globally unique). Each ID2 represents a subdivision within the entity, such as an individual business unit within an enterprise, a water district within a city, etc., or programmed for proprietary purposes.
11. Secure base signature: a base signature or scrambled alphanumeric or numerical code used in the generation of signatures per data socket descriptor.
12. Secure runtime signature: a scrambled alphanumeric or numerical code used as a signature on a per data socket descriptor basis.
13. Application name: a name given to the application instance operating on the computing system.
14. Application ID: an identification number provided to the application instance operating on the computing system.
15. Process ID: an identification number provided to a particular process which is accountable for the data.

16. Server port: the particular port on the server on which data is received or sent.
17. Transport protocol: the particular transport protocol used to send data.
18. Base Crypto Version: the version of the cryptographic process used to encrypt data.
19. Co-Lo Need: Co-locationing criterions where applications or application instances may reside together in the same server, server pool, rack, pod, or data center.
20. Architecture Tier: a tier within the system architecture on which the (web, application, database, etc.) operates.
21. Storage Attachments: an attribute that describes how the storage is attached to the computing system (e.g., direct, network, distributed, etc.)
22. Proprietary Multi-Tenant Label: a label within the ADPL tag which designates some information selectable by the user.

These unique attributes when combined together in one of many different variations, are able to identify a data socket descriptor, and locks that data socket descriptor to one particular instance of a scaled-out application group.

Now referring to FIG. 4A, an Application and Data Protection Layer (ADPL) tag 400 is shown according to one embodiment. This ADPL tag 400 may include more or less fields than those specifically shown and discussed in relation to FIG. 4A, in various embodiments, such as reserved fields, longer or shorter fields than those described below, etc.

The Start of Frame Delimiter (SFD) 402 comprises a common, identifiable sequence which indicates the presence of the ADPL tag 400 and is positioned at a start to the ADPL tag 400. The SFD 402 may have a value of 0xAB, where A and B are bit sequences that are from 2 to 8 bits in length, such as 4 bits in one embodiment, resulting in a total length of the SFD 402 of 8 bits in this embodiment.

The first ID field (ID1) 404 is configured to store a globally unique identification number that is provided for an entity, domain, client, or portion thereof, that will utilize the ADPL mechanism in application security. The first ID field 404 may have a length from 6 to 24 bits, such as 14 bits in one embodiment. In a further embodiment, an additional 2 bits may be assigned to the first ID field 404 to allow for more unique values to be represented by this field. For example, when 14 bits are used, 16,384 unique values are possible that may be used to represent 16,384 different entities; however, when 16 bits are used, 65,536 unique values are possible that may be used to represent 65,536 different entities. Moreover, the first ID field 404 may be used for segmentation or grouping of the receiver data socket descriptor and the transmitter data socket descriptor for various purposes, such as providing security to the application and data.

The second ID field (ID2) 406 is configured to store a unique identification number within the entity, domain, client, or portion thereof that is assigned an associated first ID. Each second ID may represent a subdomain, subclient, business unit, department, etc., within the entity, domain, client, etc., that is assigned the associated first ID. The second ID 406 may have a length from 2 to 12 bits, such as 6 bits in one embodiment. For example, when 6 hits are used, 64 unique values are possible that may be used to represent 64 different subdomain or units within a company represented by the associated first ID. Moreover, the second ID field 406 may be used for segmentation or grouping of the receiver data socket descriptor and the transmitter data socket descriptor for various purposes, such as providing security.

The first reserved field (Res1) 408 is an optional reserved field that may be used for future expansion and/or incorporation of additional information in the ADPL tag 400, as would be understood by one of skill in the art. The first reserved field 408 may have a length from 1 to 8 bits, such as 4 bits in one embodiment.

The security profile field 410 is configured to store a security profile value calculated for a sender or for transmitting flow from the sender of the payload that includes the ADPL tag 400. The security profile is dependent on the security status of the sender host (the system which sent the packet having the ADPL tag 400 therein) derived by threat detection agents, entities, and/or applications executing on or configured to analyze the security of the sender host. The value of this parameter may be internally interpreted by a receiver host based on various feedbacks from one or more security end des on the receiver host. The security profile field 410 may have a length from 2 to 6 bits, such as 3 bits in one embodiment. For example, when the security profile field 410 is 3 bits in length, 8 possible values are available for designation of security profile. Moreover, the security profile field 410 may be derived from various sources related to the host, and may be used to understand vulnerabilities of the transmitter data socket descriptor, the application instance associated with the transmitter data socket descriptor, and the associated host.

Evaluation by an end point protection agent (EPPA) of the security state of the sender host. The security profile represents a risk profile of the sender host. Based on the security profile, data security policies may be applied by the receiver host upon analyzing the security profile stored in the security profile field 410 of the ADPL tag 400. In addition, in some approaches, the ADPL library is configured to map the security profile to individual data socket descriptor(s) on the sender host and individual data socket descriptor(s) on the receiver host The security profile field 410 is populated in the egress payload, in one approach, only when a local EPPA determines to change the security profile than what was previously communicated in a previously sent packet.

The security profile field 410 may have the following formats:
1. All zeros (indicates for the receiver host to continue using a security profile in a last received ADPL Lag 400).
2. Non-zero (indicates a new security profile status in response to a change from a previously communicated security profile).
3. 0xFFFFFF (indicates an unknown security profile for the sender host).
4. SRC-BIT_MASK
   SRC={INVALID, EPPA, AVCD, Other} which represents the source of the security profile or the entity that provided information to form the security profile.
   BIT_MASK (a mask with each bit representing the presence or absence of individual cyber attack types having predetermined values).

The secure source signature field 412 is configured to store a value representing a secure source signature for the packet payload being sent from the sender host. The value stored in the secure source signature field 412 is a. scrambled number used as a signature on a per data socket descriptor basis. In one embodiment, the secure source signature is an application administrator provided seed signature, which is provided based on one or more policies executing on the sender host. Moreover, the secure source signature field 412 may be used to verify credibility of the sender with respect to the receiver data socket descriptor.

The secure source signature stored in the secure source signature field 412 may be generated and scrambled, in one embodiment, by a Key Generator Module (KGM) which generates unique keys based on various contexts for transmission and verification of received payload(s). The KGM may use one of 16 (or more) scramblers to scramble the secure source signature. The secure source signature field 412 may have a size from 24 to 60 bits, such as 48 bits in one embodiment.

The buffer length field (Length) 414 is configured to store a value that represents a buffer length of the application payload, prior to having the ADPL tag 400 added thereto. The buffer length field 414 may have a length from 4 to 24 bits, such as 8 bits in one embodiment. Moreover, the buffer length field 414 may be configured to store a number of bits which accommodate the remainder of modulo 4.

The sequence number ID field (Seq. ID) 416 is configured to store a value that represents a sequence number ID, which is a unique ID designating a payload sequence prior to being fragmented into individual packets of data, as is understood by those of skill in the art.

The second reserved field (Res2) 418 is an optional reserved field that may be used for future expansion and/or incorporation of additional information. in the ADPL tag 400, as would be understood by one of skill in the art. The second reserved field 418 may have a length from 4 to 24 bits, such as 16 bits in one embodiment. In one embodiment, the second reserved field 418 may be used to extend the secure source signature field 412 when more space is needed for this field, or any other.

The End of Frame Delimiter (EFD) 420 comprises a common, identifiable sequence which indicates the end of the ADPL tag 400 and is positioned at an end of the ADPL tag 400. The EFD 420 may have a value of oxBA, where A and B are bit sequences that are from 2 to 8 bits in length, such as 4 bits in one embodiment, resulting in a total length of the EFD 420 of 8 bits in this embodiment. In this embodiment, the SFD 402 and the EFD 420 recite the same two sets of sequences oxA and oxB, but swap the position of these sequences, oxAB in the SFD 402 and oxBA in the EFD 420. Of course, the SFD 402 and the EFD 420 may have another arrangement that is identifiable for marking the start and end of the ADPL tag 400 in other embodiments not specifically described herein.

In another embodiment, some or all of the ADPL tag 400 may be encrypted according to one or more of any known cryptographic algorithm, as would he known to one of skill in the art. In a further embodiment, all of the ADPL tag 400 may be encrypted except for the STD 402 and EFD 420, in order to allow for the ADPL tag 400 to be identified, and decrypted when appropriate, in response to receiving a packet containing the ADPL tag 400.

The various fields described above for the ADPL tag 400 are not limited to only the functions described herein, and more or less fields may be used in an ADPL tag 400 in various embodiments riot specifically described herein.

Now referring to FIG. 4B, a packet 450 that includes an ADPL tag 400 is shown according to one embodiment. The packet 450 may include more or less fields than those specifically shown and described in FIG. 4B. Moreover, each field may have a larger or smaller capacity than that specifically described, in various approaches. The ADPL tag 400, since it is part of the application payload, may or may not be part of each packet in response to the application payload being fragmented into multiple parts with each part being encapsulated in a separate packet.

The application payload 422 is configured to store the data portion of the packet 450 for transmission from the sender host to the receiver host, as is known by those of skill in the art.

The TCP/UDP header 424 is a field configured to store TCP and/or UDP header information for traversing the network to allow delivery of the packet 450 to its intended destination as is known to those of skill in the art.

The IPv4/IPv6 header 426 is a field configured to store IPv4 and/or IPv6 header information for traversing the network to allow delivery of the packet 450 to its intended destination as is known to those of skill in the art.

The Ethernet (Layer-2) header (Eth-L2) 428 is a field configured to store Ethernet header information for traversing the network to allow delivery of the packet 450 to its intended destination as is known to those of skill in the art.

In another embodiment, some or all of the packet 450 may be encrypted according to one or more of any known cryptographic algorithm, as would be known to one of skill in the art.

The ADPL tag 400 may be located at any position within the packet 450, including at the start of the application payload 422, within the application payload 422, at the end of the application payload 422, at any location inside the payload or between any of the other fields in the packet 450.

In FIG. 4B, the ADPL tag 400 is shown positioned between the application payload 422 and the TCP/UDP header 424 of the data packet 450, according to one embodiment.

In FIG. 4C, the ADPL tag 400 is shown embedded within the application payload 422 of a data packet 460, according to another embodimnent.

The various fields described above are not limited to only the functions described herein, and more or less fields may be used in any packet used to transmit at least a portion of an application payload and an ADPL tag 400, in various embodiments not specifically described herein.

Figures 4D, 4E:
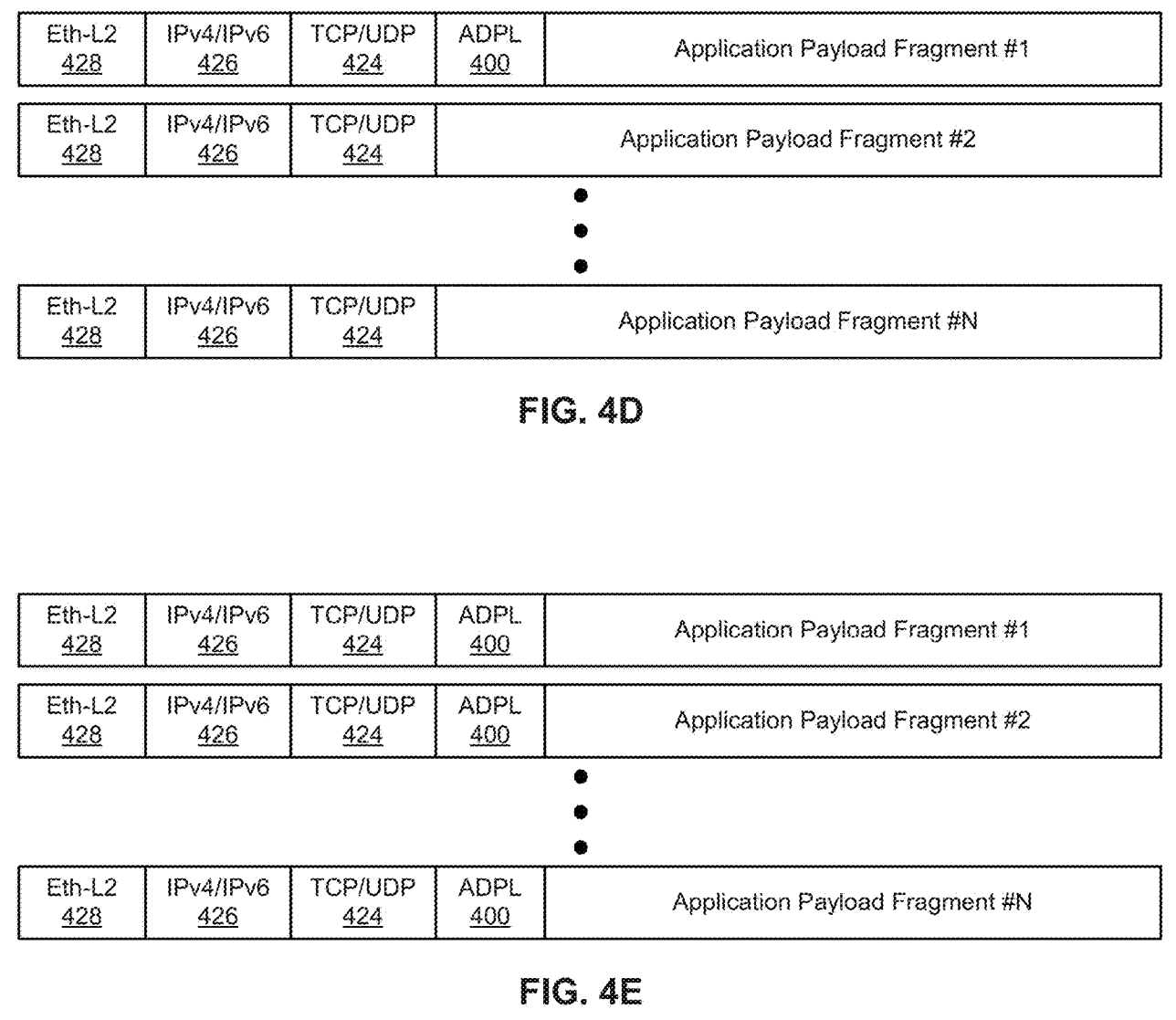

In one embodiment, one ADPL tag may be added for the whole application payload, as shown in FIG. 4D. In a situation where the application payload is fragmented by the underlying TCP/UDP, IP, or physical networks, the ADPL tag may be duplicated for each fragment of the application payload in another embodiment, as shorn in FIG. 4K The application which receives the application payload receives the whole payload arid identifies the ADPL tag 400 using the SFD 402 and EFD 420.

Current approaches to data center security utilize a form of segmentation to group and segregate applications or application instances to limit and avoid threat propagation on an application-level. However, applications are complex and have huge amounts of vulnerabilities (threat surfaces) that segmentation at an application-level does not provide deterministic security from threats and threat propagation aimed at these vulnerabilities.

According to embodiments described herein, segmentation is performed at the smallest threat surface of application possible, i.e., at the data socket descriptor-level. At this low level, just like working at a level of cell DNA, security provisioning is mathematical and deterministic. The data socket descriptors are provided with Operating System (OS) specific attributes, application specific attributes, mathematical attributes, and proprietary attributes. Segmentation is performed based on common attributes across data socket descriptors for similar application instances. Such segmentation is also referred to as pico-segmentation or use of a pico-segment.

Figure 5:
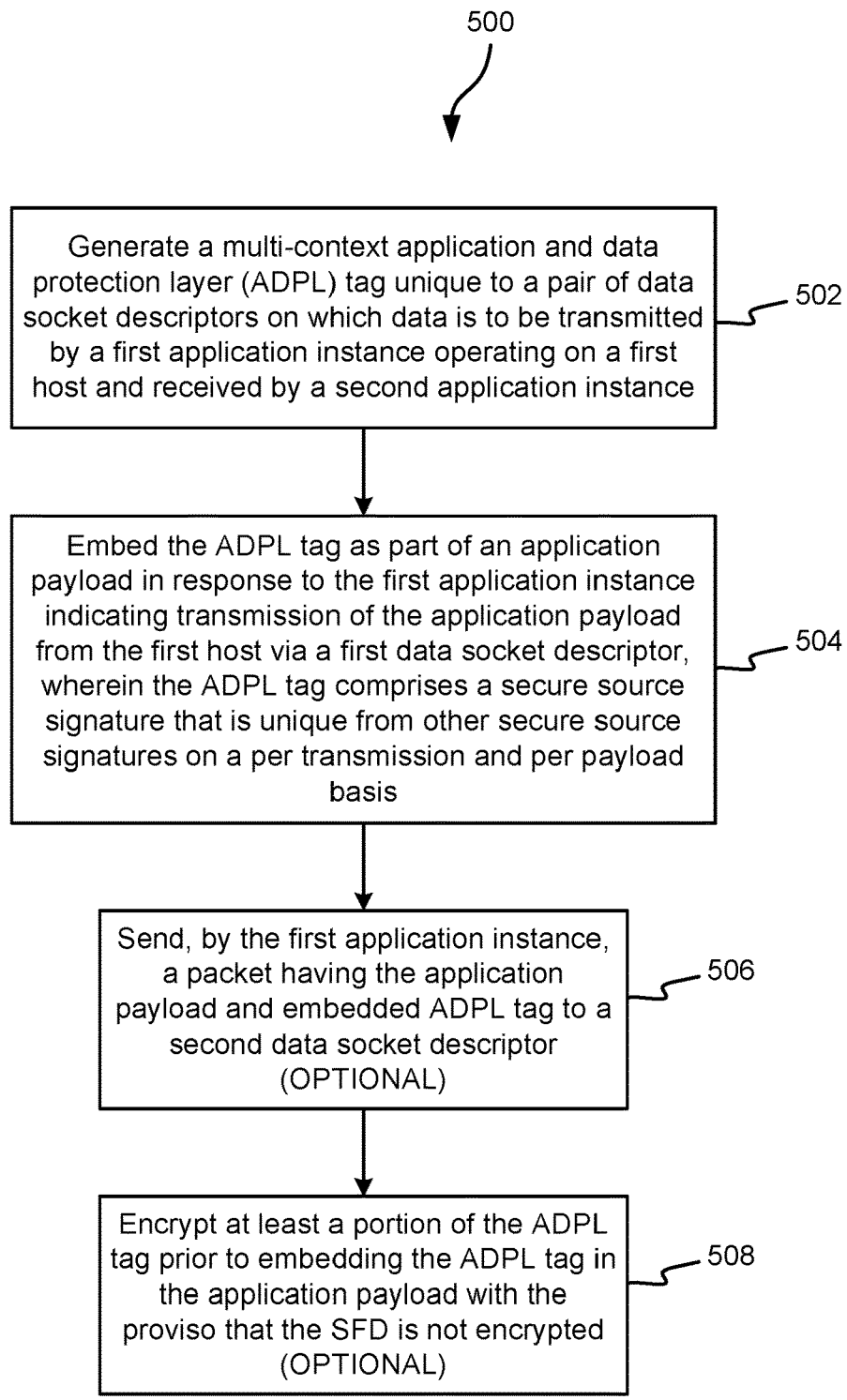
FIG. 5 shows a flowchart of a method, according to one embodiment.

Now referring to FIG. 5, a flowchart of a method 500 is shown according to one embodiment. The method 500 may be performed in accordance with the present invention in any of the environments depicted in FIGS. 1-4E, among others, in various embodiments. Of course, more or less operations than those specifically described in FIG. 5 may be included in method 500, as would he apparent to one of skill in the art upon reading the present descriptions.

Each of the steps of the method 500 may be performed by any suitable component of the operating environment. For example, in various embodiments, the method 500 may he partially or entirely performed by a server, host, computing system, processor, switch, or some other device having one or more processing units therein. The processing unit, e.g., processing circuit(s), chip(s), and/or module(s) implemented in hardware and/or software, and preferably having at least one hardware component, may be utilized in any device to perform one or more steps of the method 500. Illustrative processing units include, but are not limited to, a central processing unit (CPU), an ASIC, a FPGA, etc., combinations thereof, or any other suitable computing device known in the art.

As shown in FIG. 5, method 500 may initiate with operation 502, where a multi-context application and data protection layer (ADPL) tag is generated. The ADPL tag is unique to a pair of data socket descriptors on which data is to be received and/or transmitted by a first application instance operating on a first host and a second application instance operating on the same or a second host.

In various embodiments, the ADPL tag may comprise any or all of the fields described hereafter. A first ID field may be included in the ADPL tag that is configured to store a programmable, globally unique identification number that is provided on a per-entity basis (one ID for each entity that is utilizing the ADPL tagging scheme), which may he referred to as a client or company identification number (CID) in some approaches. A second ID field may be included in the ADPL tag that is configured to store a programmable, unique identification number within the entity provided the first ID, which may be referred to as an organization or department identification number (DID) in some approaches. A security profile field may be included in the ADPL tag that is configured to store a security profile value calculated for the first host. Also, a secure signature field may be included in the ADPL tag that is configured to store a secure source signature for the application payload.

In one embodiment, the secure source signature may be based, at least in part, on attributes of the sender data socket descriptor and a receiver data socket descriptor. In this embodiment, the attributes of the sender arid receiver data socket descriptors may include any or all of the following information: a server and/or a source IP interface, a server or host port number, a maximum number of allowable waiting connections, an application packet buffer size for transmitting and receiving data, a port number of a transport of the sender data socket descriptor, an IP address of a receiver data socket descriptor in the second host, a port number of the transport of the receiver data socket descriptor in all cases of controlled port allocations by the first application instance, bandwidth and flow specific mathematical transforms, a maximum application packet buffer size usable for transmitting data to and receiving data from the receiver data socket descriptor, etc.

In one embodiment, the ADPL tag may also include a buffer length field configured to store a value that represents a buffer length of the application payload prior to modifications due to addition of the ADPL tag to the application payload. This field may be used to identify a size of the ADPL tag within the application payload.

According to another embodiment, the ADPL tag may also include a sequence number ID field configured to store a value that represents a sequence number ID, the sequence number ID being a unique number designating a sequence of the application payload prior to being fragmented into individual packets of data for transmission to the second host. This field is used when the application payload is split amongst a plurality of data packets for transmission to another host.

According to another embodiment, the security profile value stored in the security profile field may be selected according to the following guidance. All zeros may be used to indicate for the second host to continue using a security profile in a last received ADPL tag. A non-zero value may be used to indicate that a new security profile status is being indicated in response to a change from a previously communicated security profile value. A value of 0xFFFFFF may be used to indicate an unknown security profile for the first host when the first host is unable to ascertain a security profile for itself.

In operation 504, the ADPL tag may be embedded as part of an application payload in response to the first application instance calling an application programming interface (API) configured to transmit the application payload out from the first host via a sender data socket descriptor, according to one embodiment.

In operation, the ADPL tag may be retrieved, verified, and processed as part of application payload receiving by the second application instance calling an API configured to receive the payload via a receiver data socket descriptor according to another embodiment.

In even more embodiments, the ADPL tag may be embedded in a header of one or more data packets in which the application payload is divided, in order to store the ADPL tag for receipt thereof at one of the first or second hosts.

In optional operation 506, a packet having the application payload arid embedded ADPL tag may be sent, by the first application instance, to the second host. Of course, more than one packet may be used to transmit the application payload to the second host, and each of these packets would have a matching ADPL tag embedded therein.

In a further embodiment, a second application instance operating on the second host may receive the ADPL tag as part of the application payload in response to calling an application programming interface (API) configured to receive the application payload via a receiver data socket descriptor.

Moreover, the first application instance may receive, in response to calling an API configured to receive an application payload via a receiver data socket descriptor, a second application payload, and the first application instance may extract from this second application payload a second ADPL tag.

According to one embodiment, the ADPL tag may be designated within the application payload at a start of the ADPL tag by a STD and at an end of the ADPL tag by an EFD.

Moreover, the ADPL tag may be stored at a beginning of the application payload, at an end of the application payload, or between the beginning and the end of the application payload using a programmable offset. The programmable offset may be initialized by a user, automatically according to a random or preprogramed algorithm, or according to some other suitable method of determining an offset within the application payload, as would be understood by one of skill in the art. In a further embodiment, in response to the application payload being split across more than one data packet, one ADPL tag may be embedded in each portion of the application payload, and each individual ADPL tag may be positioned in the same place, or in different places according to a predetermined scheme that is understood by the first and second hosts.

In accordance with another embodiment, in optional operation 508, at least a portion of the ADPL tag prior to embedding the ADPL tag may be encrypted in the application payload with the proviso that the SFD is not encrypted. Moreover, in a further embodiment, the application payload is not encrypted other than the portion of the ADPL tag that is encrypted.

Method 500 may be implemented as a system, process, or a computer program product. As a system, method 500 may be implemented on the first host and/or the second host as logic configured to perform method 500, along with being implemented on any other hosts on which secure communications are desired. As a computer program product, a computer readable storage medium may store program instructions configured to perform method 500.

For example, a system may include a processing circuit and logic integrated with and/or executable by the processing circuit The processing circuit is a non-transitory hardware device configured to execute logic embedded therein, or provided thereto. Examples of processing circuits include, but are not limited to, CPUs, ASICs, FPGAs, microprocessors, integrated circuits, etc. The logic is configured to cause the processing circuit to generate a multi-context ADPL tag unique to a pair of data socket descriptors on which data is to he received and/or transmitted by a first application instance operating on the system arid a second application instance operating on a second host. The logic is also configured to embed the ADPL tag as part of an application payload in response to the first application instance calling an API configured to transmit the application payload out from the system via a sender data socket descriptor.

In another example, a computer program product may include a computer readable storage medium having program instructions stored thereon. The computer readable storage medium is a non-transitory device configured to store program instructions that are executable and/or readable by a processing circuit. The program instructions are executable by a processing circuit to cause the processing circuit to perform method 500 as follows: generate a multi context ADPL tag unique to a pair of data socket descriptors on which data is to be received and/or transmitted by a first application instance operating on a first host and a second application instance operating on a second host, and embed the ADPL tag as part of an application payload in response to the first application instance calling an API configured to transmit the application payload out from the first host via a sender data socket descriptor.

Variations of the systems, methods, and computer program products described herein are also possible, and the explicit description thereof in this document is not required in order to provide those of skill in the art with the ability to conceive of such variations when reading the present descriptions.

What is claimed is:

1. A method, comprising:
   generating a multi-context application and data protection layer (ADPL) tag unique to a pair of data socket descriptors on which data is to be transmitted by a first application instance operating on a first host and received by a second application instance; and
   embedding the ADPL tag as part of an application payload in response to the first application instance indicating transmission of the application payload from the first host via a first data socket descriptor, wherein the ADPL tag comprises a secure source signature that is unique from other secure source signatures on a per transmission and per payload basis; and
   wherein the ADPL tag comprises:
      a first identification (ID) field configured to store a globally unique identification number that is provided on a per-entity basis;
      a second ID field configured to store a unique identification number within an entity which is provided the first ID;
      a security profile field configured to store a security profile value calculated for the first host; and
      a secure signature field configured to store the secure source signature for the application payload.

2. The method as recited in claim 1, wherein the secure source signature is based at least in part on attributes of the first data socket descriptor of the first host and a second data socket descriptor, the attributes of the first and second data socket descriptors being selected from a group consisting of: a server and/or a source internet protocol (IP) interface, a server port number, a maximum number of allowable waiting connections, an application packet buffer size for transmitting and receiving data, a port number of a transport of the first data socket descriptor, an IP address of the second data socket descriptor, a port number of the transport of the second data socket descriptor in all cases of controlled port allocations by the first application instance, bandwidth and flow specific mathematical transforms, and a maximum application packet buffer size usable for transmitting data to and receiving data from the second data socket descriptor.

3. The method as recited in claim 1, wherein the ADPL tag further comprises:
   a buffer length field configured to store a value that represents a buffer length of the application payload prior to modifications due to addition of the ADPL tag to the application payload; and
   a sequence number ID field configured to store a value that represents a sequence number ID, the sequence number ID being a unique number designating a sequence of the application payload prior to being fragmented into individual packets of data for transmission to a second data socket descriptor.

4. The method as recited in claim 1, wherein the security profile value stored in the security profile field is selected from a group consisting of:
   all zeros indicating to continue using a security profile in a last received ADPL tag;
   a non-zero value indicating a new security profile status in response to a change from a previously communicated security profile value; and
   0xFFFFFF indicating an unknown security profile for the first host.

5. The method as recited in claim 1, further comprising:
   sending, by the first application instance, a packet having the application payload and embedded ADPL tag to a second data socket descriptor and
   receiving, by the first application instance, a second ADPL tag as part of a second application payload in response to receiving one or more application payloads via the first data socket descriptor of the first host, wherein the second ADPL tag comprises a second secure source signature that is generated based on the secure source signature of the ADPL tag.

6. The method as recited in claim 1, wherein the ADPL tag is designated within the application payload at a start of the ADPL tag by a start of frame delimiter (SFD) and at an end of the ADPL tag by an end of frame delimiter (EFD).

7. The method as recited in claim 6, wherein the ADPL tag is stored at a beginning of the application payload, at an end of the application payload, or between the beginning and the end of the application payload using a programmable offset.

8. The method as recited in claim 6, further comprising encrypting at least a portion of the ADPL tag prior to embedding the ADPL tag in the application payload with the proviso that the SFD and the EFD are not encrypted.

9. The method as recited in claim 8, wherein the application payload is not encrypted other than the portion of the ADPL tag that is encrypted.

10. A system, comprising:
a processing circuit and logic integrated with and/or executable by the processing circuit, the logic being configured to cause the processing circuit to:
generate a multi-context application and data protection layer (ADPL) tag unique to a pair of data socket descriptors on which data is to be transmitted by a first application instance operating on the system and received by a second application instance; and
embed the ADPL tag as part of an application payload in response to the first application instance indicating transmission of the application payload from the system via a first data socket descriptor, wherein the ADPL tag comprises a secure source signature that is unique from other secure source signatures on a per transmission and per payload basis; and
wherein the ADPL tag comprises:
a first identification (ID) field configured to store a globally unique identification number that is provided on a per-entity basis;
a second ID field configured to store a unique identification number within an entity which is provided the first ID;
a security profile field configured to store a security profile value calculated for the system; and
a secure signature field configured to store the secure source signature for the application payload.

11. The system as recited in claim 10, wherein the ADPL tag further comprises:
a buffer length field configured to store a value that represents a buffer length of the application payload prior to modifications due to addition of the ADPL tag to the application payload; and
a sequence number ID field configured to store a value that represents a sequence number ID, the sequence number ID being a unique number designating a sequence of the application payload prior to being fragmented into individual packets of data for transmission to a second data socket descriptor.

12. The system as recited in claim 11, wherein the secure source signature is based at least in part on attributes of the first data socket descriptor of the system and a second data socket descriptor, the attributes of the first and second data socket descriptors being selected from a group consisting of: a server and/or a source internet protocol (IP) interface, a server port number, a maximum number of allowable waiting connections, an application packet buffer size for transmitting and receiving data, a port number of a transport of the first data socket descriptor, an IP address of the second data socket descriptor, a port number of the transport of the second data socket descriptor in all cases of controlled port allocations by the first application instance, bandwidth and flow specific mathematical transforms, and a maximum application packet buffer size usable for transmitting data to and receiving data from the second data socket descriptor, and wherein the security profile value stored in the security profile field is selected from a group consisting of:
all zeros indicating to continue using a security profile in a last received ADPL tag;
a non-zero value indicating a new security profile status in response to a change from a previously communicated security profile value; and
0xFFFFFF indicating an unknown security profile for the system.

13. The system as recited in claim 10, wherein the logic is further configured to cause the processing circuit to:
send, by the first application instance, a packet having the application payload and embedded ADPL tag to a second data socket descriptor; and
receive, by the first application instance, a second ADPL tag as part of a second application payload in response to receiving one or more application payloads via the first-data socket descriptor of the system, wherein the second ADPL tag comprises a second secure source signature that is generated based on the secure source signature of the ADPL tag.

14. The system as recited in claim 10, wherein the ADPL tag is designated within the application payload at a start of the ADPL tag by a start of frame delimiter (SFD) and at an end of the ADPL tag by an end of frame delimiter (EFD), and wherein the ADPL tag is stored at a beginning of the application payload, at an end of the application payload, or between the beginning and the end of the application payload using a programmable offset.

15. The system as recited in claim 14, wherein the logic is further configured to cause the processing circuit to encrypt at least a portion of the ADPL tag prior to embedding the ADPL tag in the application payload with the proviso that the SFD and the EFD are not encrypted, wherein the application payload is not encrypted other than the portion of the ADPL tag that is encrypted.

16. A computer program product, comprising a non-transitory computer readable storage medium having program instructions stored thereon, the program instructions being executable by a processing circuit to cause the processing circuit to:
generate a multi-context application and data protection layer (ADPL) tag unique to a pair of data socket descriptors on which data is to be transmitted by a first application instance operating on a first host and received by a second application instance; and
embed the ADPL tag as part of an application payload in response to the first application instance indicating transmission of-the application payload from the first host via a first data socket descriptor, wherein the ADPL tag comprises a secure source signature that is unique from other secure source signatures on a per transmission and per payload basis; and
wherein the ADPL tag comprises:
a first identification (ID) field configured to store a globally unique identification number that is provided on a per-entity basis;

a second ID field configured to store a unique identification number within an entity which is provided the first ID;
a security profile field configured to store a security profile value calculated for the first host; and
a secure signature field configured to store the secure source signature.

17. The computer program product as recited in claim 16, wherein the ADPL tag further comprises:
a buffer length field configured to store a value that represents a buffer length of the application payload prior to modifications due to addition of the ADPL tag to the application payload; and
a sequence number ID field configured to store a value that represents a sequence number ID, the sequence number ID being a unique number designating a sequence of the application payload prior to being fragmented into individual packets of data for transmission to a second data socket descriptor.

18. The computer program product as recited in claim 17, wherein the secure source signature is based at least in part on attributes of the first data socket descriptor of the first host and a second data socket descriptor, the attributes of the first and second data socket descriptors being selected from a group consisting of: a server and/or a source internet protocol (IP) interface, a server port number, a maximum number of allowable waiting connections, an application packet buffer size for transmitting and receiving data, a port number of a transport of the first data socket descriptor, an IP address of the second data socket descriptor, a port number of the transport of the second data socket descriptor in all cases of controlled port allocations by the first application instance, bandwidth and flow specific mathematical transforms, and a maximum application packet buffer size usable for transmitting data to and receiving data from the second data socket descriptor, and
wherein the security profile value stored in the security profile field is selected from a group consisting of:
all zeros indicating to continue using a security profile in a last received ADPL tag;
a non-zero value indicating a new security profile status in response to a change from a previously communicated security profile value; and
0xFFFFFF indicating an unknown security profile for the first host.

19. The computer program product as recited in claim 16, wherein the ADPL tag is designated within the application payload at a start of the ADPL tag by a start of frame delimiter (SFD) and at an end of the ADPL tag by an end of frame delimiter (EFD), wherein the program instructions are further executable by the processing circuit to cause the processing circuit to encrypt at least a portion of the ADPL tag prior to embedding the ADPL tag in the application payload with the proviso that the SFD and the EFD are not encrypted, wherein the application payload is not encrypted other than the portion of the ADPL tag that is encrypted, and wherein the ADPL tag is stored at a beginning of the application payload, at an end of the application payload, or between the beginning and the end of the application payload using a programmable offset.

* * * * *